United States Patent
Chen et al.

(10) Patent No.: US 10,342,106 B1
(45) Date of Patent: Jul. 2, 2019

(54) SMART DIMMING SYSTEM

(71) Applicant: Ming-Tsung Chen, Taipei (TW)

(72) Inventors: Ming-Tsung Chen, Taipei (TW);
Szu-Mei Sun, Taoyuan (TW)

(73) Assignee: Ming-Tsung Chen, Taipei (TW)

( * ) Notice: Subject to any disclaimer, the term of this patent is extended or adjusted under 35 U.S.C. 154(b) by 0 days.

(21) Appl. No.: 16/227,001

(22) Filed: Dec. 20, 2018

(51) Int. Cl.
*H05B 37/02* (2006.01)
*H05B 33/08* (2006.01)

(52) U.S. Cl.
CPC ..... *H05B 37/0272* (2013.01); *H05B 33/0815* (2013.01); *H05B 33/0845* (2013.01); *H05B 33/0863* (2013.01)

(58) Field of Classification Search
CPC ............ H05B 37/0272; H05B 33/0845; H05B 33/0863
USPC ........................................................ 315/291
See application file for complete search history.

(56) References Cited

U.S. PATENT DOCUMENTS

| | | | | |
|---|---|---|---|---|
| 9,730,298 B2* | 8/2017 | Vangeel | ................... | G06F 8/654 |
| 10,098,201 B1* | 10/2018 | Wilson | ................. | H05B 33/089 |
| 2015/0334802 A1* | 11/2015 | Ryu | ................... | H05B 33/0809 |
| | | | | 315/193 |
| 2018/0177026 A1* | 6/2018 | Bowser | .............. | H05B 33/0827 |

* cited by examiner

*Primary Examiner* — Thuy V Tran
(74) *Attorney, Agent, or Firm* — Li & Cai Intellectual Property (USA) Office

(57) ABSTRACT

A smart dimming system includes: a server communicated with a control device; a Bluetooth series interface control module; a first series dimming control module electrically connected to a first light-emitting diode lamp module; and a second series dimming control module electrically connected to a second light-emitting diode lamp module. One of the first series dimming control module and the second series dimming control module is electrically connected to the Bluetooth series interface control module. A dimming control signal is transmitted to the server, the server provides a Bluetooth control signal to the Bluetooth series interface control module according to the dimming control signal, and the Bluetooth series interface control module provides a series dimming signal to one of the first series dimming control module and the second series dimming control module to dim light of the first light-emitting diode lamp module and the second light-emitting diode lamp module.

7 Claims, 4 Drawing Sheets

SMART DIMMING SYSTEM

FIELD OF THE DISCLOSURE

The present disclosure relates to a smart dimming system, and more particularly to a smart dimming system that uses Bluetooth and RS232 series interfaces for controlling.

BACKGROUND OF THE DISCLOSURE

In the field of light-emitting diode (LED) lamps, a dimming function is very important. In a conventional dimming system, as shown in FIG. 1, a dimmer 91 is electrically connected to an LED driving module 92, and the LED driving module 92 is electrically connected to an LED lamp 93. The dimmer 91 is disposed at a place where an AC voltage VAC is inputted. That is to say, a conventional dimming method uses the dimmer 91 to cut the AC voltage waveform to achieve a dimming effect, but the method is considered being low efficiency in terms of electrical loop.

Accordingly, it has become an important issue to provide a smart dimming system in the industry.

SUMMARY OF THE DISCLOSURE

The present disclosure provides a smart dimming system, which includes: a server communicated with a control device; a Bluetooth series interface control module connected to the server through a Bluetooth communication protocol; a first series dimming control module electrically connected to a first light-emitting diode lamp module; and a second series dimming control module electrically connected to a second light-emitting diode lamp module. The first series dimming control module is electrically connected to the second series dimming control module. One of the first series dimming control module and the second series dimming control module is electrically connected to the Bluetooth series interface control module. The control device provides a dimming control signal to the server, the server provides a Bluetooth control signal to the Bluetooth series interface control module according to the dimming control signal, and the Bluetooth series interface control module provides a series dimming signal to one of the first series dimming control module and the second series dimming control module according to the Bluetooth control signal to dim brightness of the first light-emitting diode lamp module and the second light-emitting diode lamp module.

The Bluetooth series interface control module includes: an interface processing unit; a Bluetooth communication unit electrically connected to the interface processing unit to receive the Bluetooth control signal; and a series interface control unit electrically connected to the Bluetooth communication unit and the interface processing unit. The interface processing unit converts the Bluetooth control signal received by the Bluetooth communication unit to the series dimming signal.

The first series dimming control module includes: a first alternating current to direct current (AC-to-DC) converting unit; a first processing unit electrically connected to the first AC-to-DC converting unit; a first series dimming unit electrically connected to the first processing unit; and a first constant current driving unit electrically connected to the first series dimming unit and the first AC-to-DC converting unit. The second series dimming control module includes: a second AC-to-DC converting unit; a second processing unit electrically connected to the second AC-to-DC converting unit; a second series dimming unit electrically connected to the second processing unit; and a second constant current driving unit electrically connected to the second series dimming unit and the second AC-to-DC converting unit. The first series dimming unit is electrically connected to the second series dimming unit.

The first series dimming unit and the second series dimming unit are RS232 interfaces.

The Bluetooth series interface control module communicates with the server by Bluetooth communication protocol 4.0 or Bluetooth communication protocol 5.0.

In summary, the smart dimming system of the present disclosure transmits a control dimming signal to the server through the control device. The server transmits the control dimming signal to the Bluetooth series interface control module of the smart dimming system to effectively control brightness of the light-emitting diode lamp modules through the RS232 series interface. The control interfaces can be the same, and the light-emitting diode lamp modules can illuminate in the same brightness. Compared to the low-efficiency dimming mode of the conventional dimmer, in the present disclosure, the light-emitting diode lamp modules in different areas can be effectively controlled.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
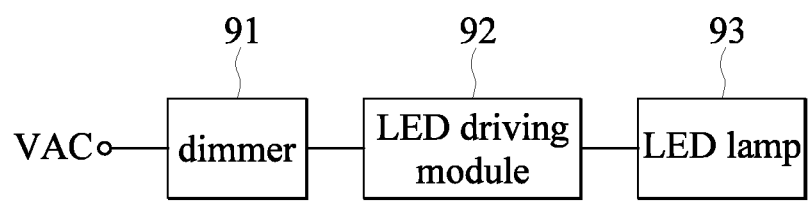
FIG. 1 is a schematic view showing a conventional dimming system.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
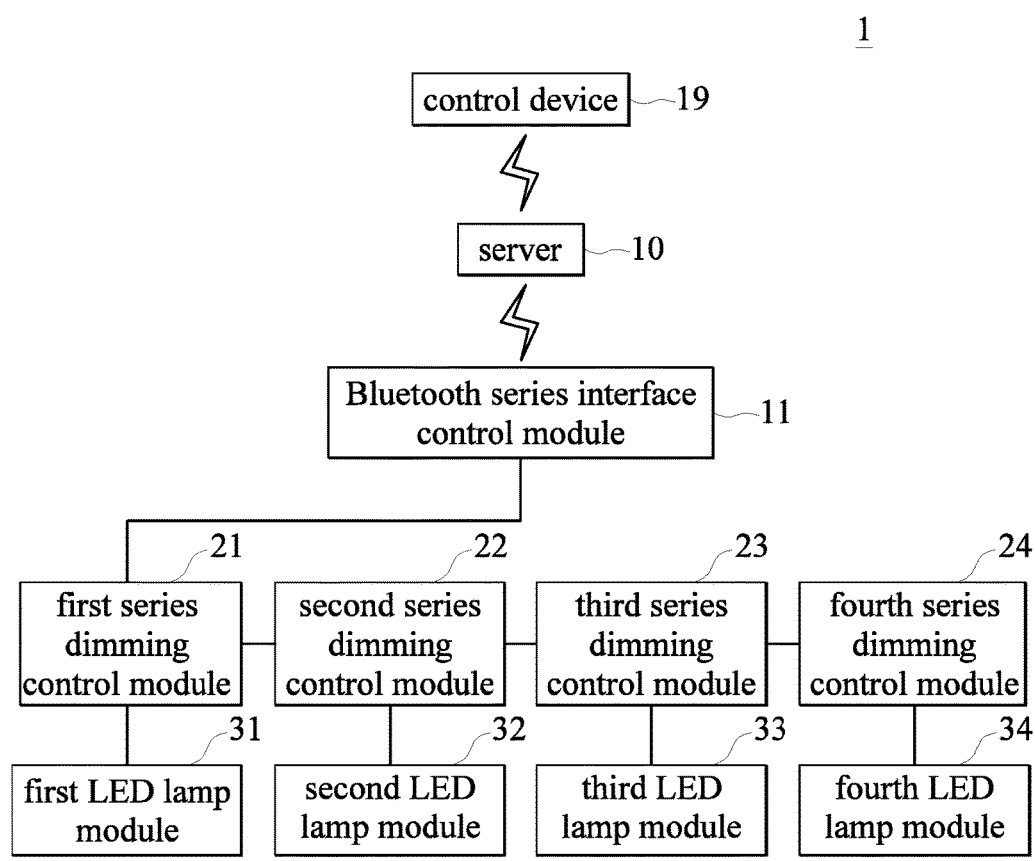
FIG. 2 is a schematic view showing a smart dimming system depicted in accordance with an exemplary embodiment of the present disclosure.
Figure 3:
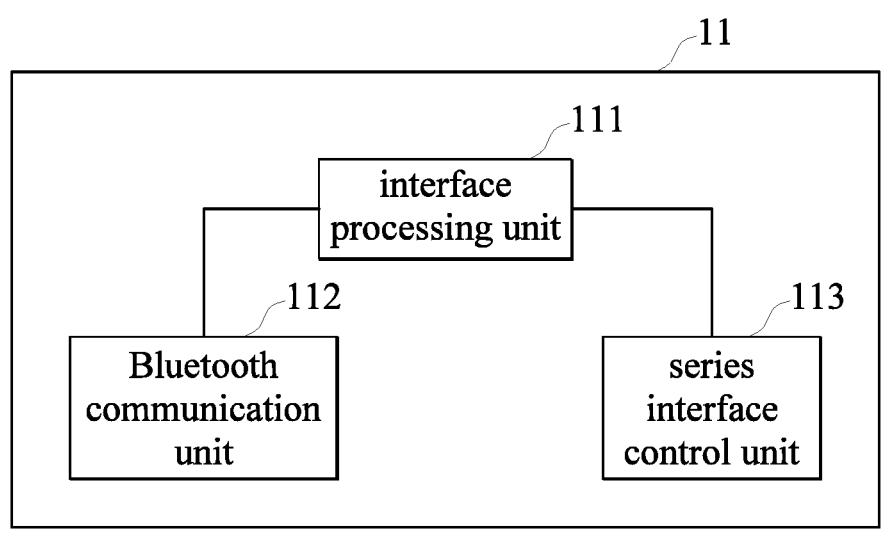
FIG. 3 is schematic views showing a Bluetooth series interface control module depicted in accordance with an exemplary embodiment of the present disclosure.
Figure 4:
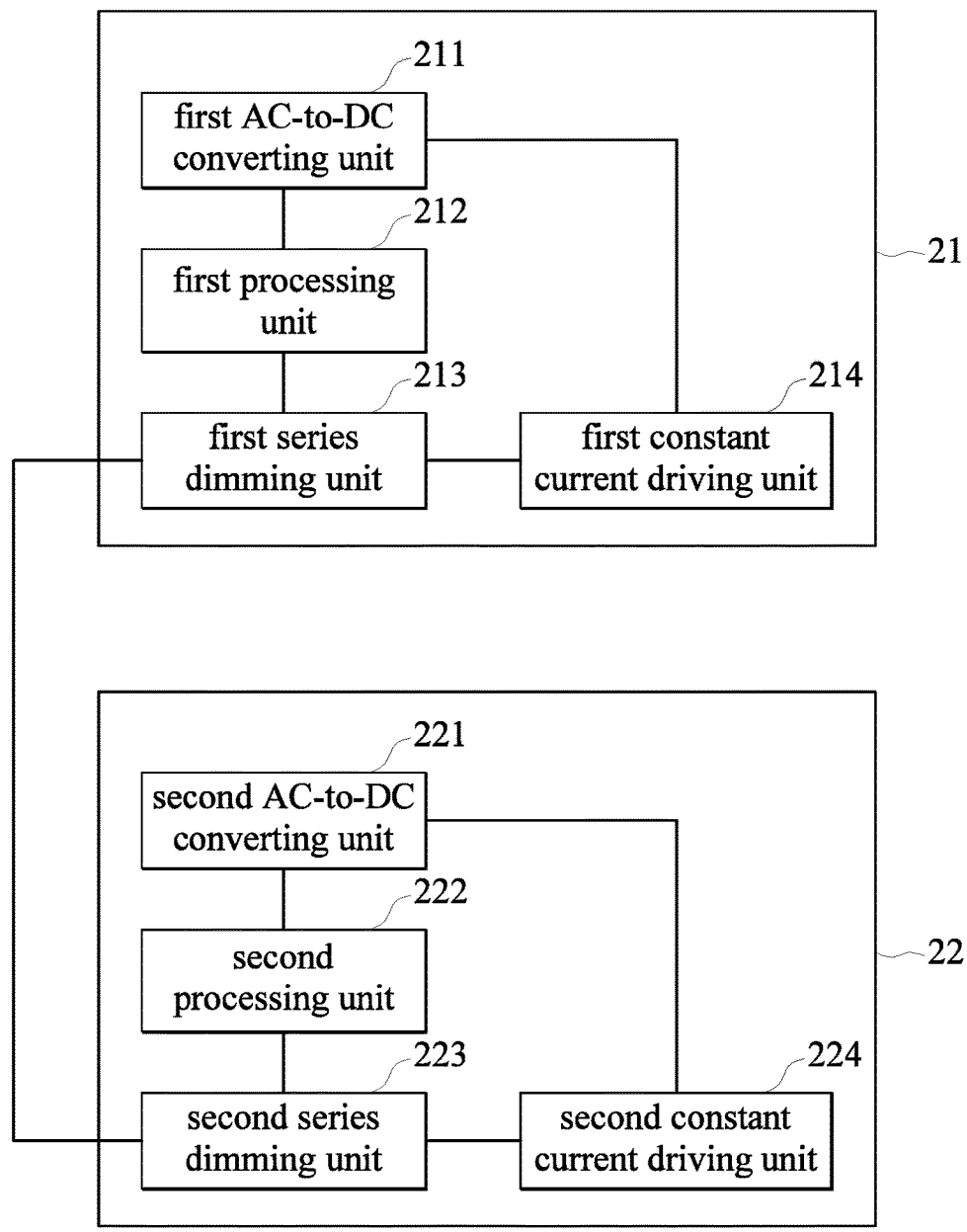
FIG. 4 is schematic views showing a first series dimming module and a second series dimming module depicted in accordance with an exemplary embodiment of the present disclosure.

Reference is made to FIG. 2, FIG. 3, and FIG. 4. FIG. 2 is a schematic view showing a smart dimming system depicted in accordance with an exemplary embodiment of the present disclosure. FIG. 3 is a schematic view showing a Bluetooth series interface control module depicted in accordance with an exemplary embodiment of the present disclosure. FIG. 4 is a schematic view showing a first series dimming module and a second series dimming module depicted in accordance with an exemplary embodiment of the present disclosure.

In the embodiment, a smart dimming system 1 includes a server 10, a Bluetooth series interface control module 11, a first series dimming control module 21, a second series dimming control module 22, a third series dimming control module 23, a fourth series dimming control module 24, a first light-emitting diode (LED) lamp module 31, a second LED lamp module 32, a third LED lamp module 33, and a fourth LED lamp module 34.

The smart dimming system 1 further includes a control device 19. The server 10 communicates with the control device 19. The Bluetooth series interface control module 11 is connected to the server 10 through a Bluetooth communication protocol.

The Bluetooth series interface control module 11 is electrically connected to the first series dimming control module 21, the second series dimming control module 22, the third series dimming control module 23, and the fourth series dimming control module 24.

The first series dimming control module 21 is electrically connected to the first LED lamp module 31. The second series dimming control module 22 is electrically connected to the second LED lamp module 32. The third series dimming control module 23 is electrically connected to the third LED lamp module 33. The fourth series dimming control module 24 is electrically connected to the fourth LED lamp module 34.

In the embodiment, the first series dimming control module 21 is electrically connected to the second series dimming control module 22. The second series dimming control module 22 is electrically connected to the third series dimming control module 23. The third series dimming control module 23 is electrically connected to the fourth series dimming control module 24.

In the embodiment, the control device 19 provides a dimming control signal to the server 10. The server 10 provides a Bluetooth control signal to the Bluetooth series interface control module 11 according to the dimming control signal. The Bluetooth series interface control module 11 provides a series dimming signal to the first series dimming control module 21, the second series dimming control module 22, the third series dimming control module 23, and the fourth series dimming control module 24 according to the Bluetooth control signal to dim brightness of the first LED lamp module 31, the second LED lamp module 32, the third LED lamp module 33, and the fourth lamp module 34.

In other embodiments, the first series dimming control module 21, the second series dimming control module 22, the third series dimming control module 23, and the fourth series dimming control module 24 are respectively the Bluetooth series interface control module 11. The Bluetooth series interface control module 11 sends the series dimming signal to the first series dimming control module 21, the second series dimming control module 22, the third series dimming control module 23, and the fourth series dimming control module 24.

In addition, the first series dimming control module 21, the second series dimming control module 22, the third series dimming control module 23, and the fourth series dimming control module 24 can be connected to each other to increase a transmission speed of the series dimming signal.

In the embodiment, the Bluetooth series interface control module 11 includes an interface processing unit 111, a Bluetooth communication unit 112, and a series interface control unit 113.

The Bluetooth communication unit 112 is electrically connected to the interface processing unit 111 to receive the Bluetooth control signal. The series interface control unit 113 is electrically connected to the Bluetooth communication unit 112 and the interface processing unit 111. The interface processing unit 111 converts the Bluetooth control signal received by the Bluetooth communication unit 112 to the series dimming signal, and transmits the series dimming signal to the first series dimming control module 21, the second series dimming control module 22, the third series dimming control module 23, and the fourth series dimming control module 24 through the series interface control unit 113. That is to say, the interface processing unit 111 converts the Bluetooth control signal received by the Bluetooth communication unit 112 to the series dimming signal, and transmits the series dimming signal to one of the first series dimming control module 21, the second series dimming control module 22, the third series dimming control module 23, and the fourth series dimming control module 24 through the series interface control unit 113. In the embodiment, the interface processing unit 111 converts the Bluetooth control signal received by the Bluetooth communication unit 112 to the series dimming signal, and transmits the series dimming signal to the first series dimming control module 21 through the series interface control unit 113. Next, the first series dimming control module 21 sequentially transmits the series dimming signal to the second series dimming control module 22, the third series dimming control module 23, and the fourth series dimming control module 24.

In other embodiments, the first series dimming control module 21, the second series dimming control module 22, the third series dimming control module 23, and the fourth series dimming control module 24 are electrically connected to the series interface control unit 113 of the Bluetooth series interface control module 11.

In the embodiment, the number of the first series dimming control module 21, the second series dimming control module 22, the third series dimming control module 23, and the fourth series dimming control module 24 can be adjusted according to actual demands, which is not limited in the present disclosure.

The series interface control unit 113 of the Bluetooth series interface control module 11 is electrically connected to the first series dimming control module 21.

Since the structures and functions of the first series dimming control module 21, the second series dimming control module 22, the third series dimming control module 23, and the fourth series dimming control module 24 are similar, only structures of the first series dimming control module 21 and the second series dimming control module 22 are described in the following, and structures and functions of other series dimming control modules are not described herein.

The first series dimming control module 21 includes a first alternating current to direct current (AC-to-DC) converting unit 211, a first processing unit 212, a first series dimming unit 213, and a first constant current driving unit 214.

The second series dimming control module 22 includes a second AC-to-DC converting unit 221, a second processing unit 222, a second series dimming unit 223, and a second constant current driving unit 224.

The first processing unit 212 is electrically connected to the first AC-to-DC converting unit 211. The first series dimming unit 213 is electrically connected to the first processing unit 212. The first constant current driving unit 214 is electrically connected to the first series dimming unit 213 and the first AC-to-DC converting unit 211. The second processing unit 222 is electrically connected to the second AC-to-DC converting unit 221. The second series dimming unit 223 is electrically connected to the second processing unit 222. The second constant current driving unit 224 is electrically connected to the second series dimming unit 223 and the second AC-to-DC converting unit 221.

In the embodiment, the first AC-to-DC converting unit 211 and the second AC-to-DC converting unit 221 convert received AC voltages, such as 110V or 220V, to appropriate DC voltages, such as 12V, 48V.

The first series dimming unit 213 and the second series dimming unit 223 are RS232 interfaces. That is to say, the first series dimming unit 213 and the second series dimming unit 223 can be electrically connected to each other for signal transmission. In the embodiment, the first series dimming unit 213 is electrically connected to the second series dimming unit 223 to transmit the series control signal.

In other embodiments, the first series dimming unit 213 and the second series dimming unit 223 can be an RS485 interface unit or I²C interface unit. In the embodiment, the Bluetooth series interface control module 11 communicates with the server 10 by using Bluetooth communication protocol 4.0 or Bluetooth communication protocol 5.0.

In summary, the smart dimming system of the present disclosure transmits the control dimming signal to the server through the control device. The server transmits the control dimming signal to the Bluetooth series interface control module of the smart dimming system to effectively control brightness of the light-emitting diode lamp modules through the RS232 series interface. The control interfaces can be the same, and the light-emitting diode lamp modules can illuminate in the same brightness. Compared to the low-efficiency dimming mode of the conventional dimmer, in the present disclosure, the LED lamp modules in different areas can be effectively controlled.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A smart dimming system comprising:
   a server, communicated with a control device;
   a Bluetooth series interface control module, connected to the server through a Bluetooth communication protocol;
   a first series dimming control module, electrically connected to a first light-emitting diode lamp module; and
   a second series dimming control module, electrically connected to a second light-emitting diode lamp module, wherein at least one of the first series dimming control module and the second series dimming control module is electrically connected to the Bluetooth series interface control module;
   wherein the control device provides a dimming control signal to the server, the server provides a Bluetooth control signal to the Bluetooth series interface control module according to the dimming control signal, and the Bluetooth series interface control module provides a series dimming signal to one of the first series dimming control module and the second series dimming control module according to the Bluetooth control signal to dim brightness of the first light-emitting diode lamp module and the second light-emitting diode lamp module.

2. The smart dimming system according to claim 1, wherein the first series dimming control module is electrically connected to the second series dimming control module.

3. The smart dimming system according to claim 1, wherein the first series dimming control module and the second series dimming control module are electrically connected to the Bluetooth series interface control module.

4. The smart dimming system according to claim 3, wherein the first series dimming unit and the second series dimming unit are RS232 interfaces.

5. The smart dimming system according to claim 1, wherein the Bluetooth series interface control module includes:
   an interface processing unit;
   a Bluetooth communication unit, electrically connected to the interface processing unit to receive the Bluetooth control signal; and
   a series interface control unit, electrically connected to the Bluetooth communication unit and the interface processing unit;
   wherein the interface processing unit converts the Bluetooth control signal received by the Bluetooth communication unit to the series dimming signal.

6. The smart dimming system according to claim 1, wherein
   the first series dimming control module includes:
   a first alternating current to direct current (AC-to-DC) converting unit;
   a first processing unit, electrically connected to the first AC-to-DC converting unit;
   a first series dimming unit, electrically connected to the first processing unit; and
   a first constant current driving unit, electrically connected to the first series dimming unit and the first AC-to-DC converting unit; and
   the second series dimming control module includes:

a second AC-to-DC converting unit;
a second processing unit, electrically connected to the second AC-to-DC converting unit;
a second series dimming unit, electrically connected to the second processing unit; and
a second constant current driving unit, electrically connected to the second series dimming unit and the second AC-to-DC converting unit; and
wherein the first series dimming unit is electrically connected to the second series dimming unit.

7. The smart dimming system according to claim 1, wherein the Bluetooth series interface control module communicates with the server by using Bluetooth communication protocol 4.0 or Bluetooth communication protocol 5.0.

\* \* \* \* \*